United States Patent
Cui et al.

(10) Patent No.: US 11,426,822 B2
(45) Date of Patent: Aug. 30, 2022

(54) BRAZE COMPOSITION AND PROCESS OF USING

(71) Applicant: General Electric Company, Schenectady, NY (US)

(72) Inventors: Yan Cui, Greer, SC (US); Michael Douglas Arnett, Simpsonville, SC (US); Ethan Conrad Schaeffer, Greenville, SC (US); Brian Lee Tollison, Honea Path, SC (US); Matthew Joseph Laylock, Easley, SC (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 17/110,660

(22) Filed: Dec. 3, 2020

(65) Prior Publication Data

US 2022/0176499 A1    Jun. 9, 2022

(51) Int. Cl.
| | |
|---|---|
| *B23K 1/00* | (2006.01) |
| *C22C 19/00* | (2006.01) |
| *B23K 35/30* | (2006.01) |
| *C22C 19/05* | (2006.01) |
| *B23K 101/00* | (2006.01) |

(52) U.S. Cl.
CPC .......... *B23K 35/304* (2013.01); *B23K 1/0018* (2013.01); *C22C 19/058* (2013.01); *B23K 2101/001* (2018.08)

(58) Field of Classification Search
CPC .. B23K 35/3033–304; B23K 2101/001; B23K 1/00–206; C22C 19/058
USPC .......... 228/245–262, 262.3–262.31; 29/889.1–889.722; 420/441, 442, 445, 420/460
See application file for complete search history.

(56) References Cited

U.S. PATENT DOCUMENTS

| | | | | |
|---|---|---|---|---|
| 3,865,581 | A | * | 2/1975 | Sekino .................. C22C 19/058 420/47 |
| 4,639,388 | A | * | 1/1987 | Ainsworth ................ B32B 7/08 428/222 |
| 5,156,321 | A | | 10/1992 | Liburdi et al. |
| 5,240,491 | A | | 8/1993 | Budinger et al. |
| 5,536,022 | A | * | 7/1996 | Sileo ..................... F01D 11/122 415/174.4 |

(Continued)

FOREIGN PATENT DOCUMENTS

| | | |
|---|---|---|
| CA | 2991819 A1 | 10/2018 |
| CN | 114603273 | 6/2022 |

(Continued)

OTHER PUBLICATIONS

"Amdry DF-4B Diffusion Braze Alloy", Oerlikon Metco, Dec. 31, 2014, pp. 1-3, retrieved from https://www.berlikon.com/ecoma/files.

(Continued)

*Primary Examiner* — Kiley S Stoner
(74) *Attorney, Agent, or Firm* — James Pemrick; Hoffman Warnick LLC

(57) ABSTRACT

A composition includes the constituents, in approximate weight percentages: Chromium 15-17; Silicon 2.5-3.5; Cobalt 6.0-8.0; Aluminum 1.0-2.0; Tantalum 1.5-2.5; Boron 1.5-2.5; Yttrium 0.015-0.025; Nickel balance; and incidental impurities.

14 Claims, 1 Drawing Sheet

(56) References Cited

U.S. PATENT DOCUMENTS

| | | | |
|---|---|---|---|
| 5,714,735 A | 2/1998 | Offer | |
| 6,458,318 B1* | 10/2002 | Nishiyama | C22C 19/055 420/447 |
| 8,273,148 B2* | 9/2012 | Minor | C22C 19/05 75/255 |
| 9,023,188 B2* | 5/2015 | Williams | B23H 9/10 205/652 |
| 10,571,126 B2 | 2/2020 | Lin et al. | |
| 10,640,849 B1* | 5/2020 | Cui | C22C 19/056 |
| 2003/0005981 A1* | 1/2003 | Ogawa | B23K 35/304 148/428 |
| 2004/0076540 A1* | 4/2004 | Imano | B23K 35/3033 420/450 |
| 2006/0127660 A1* | 6/2006 | Kuenzler | C23C 30/00 428/312.8 |
| 2006/0216540 A1 | 9/2006 | Budinger et al. | |
| 2007/0202002 A1* | 8/2007 | James | C22C 19/057 420/443 |
| 2008/0017694 A1 | 1/2008 | Schnell et al. | |
| 2008/0038575 A1* | 2/2008 | Renteria | C23C 26/00 428/548 |
| 2008/0292489 A1* | 11/2008 | Yamamoto | C22C 38/06 420/47 |
| 2008/0304996 A1* | 12/2008 | Brady | C22C 38/06 420/49 |
| 2009/0162562 A1* | 6/2009 | Nagaraj | B32B 15/017 427/372.2 |
| 2009/0162690 A1* | 6/2009 | Nagaraj | C23C 28/3215 428/623 |
| 2009/0162692 A1* | 6/2009 | Nagaraj | C23C 4/134 428/680 |
| 2009/0252985 A1* | 10/2009 | Nagaraj | C23C 4/10 428/332 |
| 2010/0008778 A1* | 1/2010 | Patrick | F01D 5/26 416/144 |
| 2012/0231295 A1 | 9/2012 | Kottilingam et al. | |
| 2015/0082806 A1* | 3/2015 | Willis | F23R 3/286 228/101 |
| 2016/0003064 A1* | 1/2016 | Stratton | B23K 35/304 228/160 |
| 2016/0003065 A1* | 1/2016 | Stratton | B23K 1/0018 228/160 |
| 2016/0175991 A1* | 6/2016 | Kottilingam | B23K 35/304 219/121.45 |
| 2016/0339544 A1* | 11/2016 | Xu | B22F 7/08 |
| 2017/0151637 A1* | 6/2017 | Ichikawa | C22C 21/06 |
| 2017/0259462 A1* | 9/2017 | Kottilingam | F01D 5/186 |
| 2018/0161943 A1 | 6/2018 | Cui et al. | |
| 2018/0224124 A1* | 8/2018 | Lin | B23K 1/19 |
| 2018/0304420 A1 | 10/2018 | Zheng et al. | |
| 2018/0318922 A1* | 11/2018 | Valls Anglés | C22C 19/03 |
| 2018/0361495 A1* | 12/2018 | Eminoglu | B23K 26/34 |
| 2019/0047094 A1* | 2/2019 | Puidokas | B23K 31/125 |
| 2019/0275617 A1* | 9/2019 | Bulgrin | B23K 1/19 |
| 2019/0284666 A1* | 9/2019 | Okada | C22C 38/00 |
| 2020/0139493 A1* | 5/2020 | Henderkott | C22C 19/056 |
| 2020/0254548 A1* | 8/2020 | Xu | B23K 1/0008 |
| 2021/0205909 A1* | 7/2021 | Henderkott | C22C 19/058 |
| 2021/0260649 A1* | 8/2021 | Heinze | C22C 32/0026 |

FOREIGN PATENT DOCUMENTS

| | | | | |
|---|---|---|---|---|
| EP | 1702081 B1 | | 2/2008 | |
| EP | 3118345 A1 | * | 1/2017 | C22C 19/058 |
| JP | 2019112687 A | * | 7/2019 | |
| JP | 6772736 B2 | * | 10/2020 | |
| WO | WO-9923265 A1 | * | 5/1999 | C22C 1/0433 |
| WO | WO-9923279 A1 | * | 5/1999 | C22C 1/0433 |
| WO | WO-0075398 A1 | * | 12/2000 | C22C 1/0433 |
| WO | WO-2013021853 A1 | * | 2/2013 | C22C 19/055 |

OTHER PUBLICATIONS

EP Patent Application No. 21209844.6, European Search Report and Opinion dated Jun. 22, 2022, 9 pgs.
CN Patent Application No. 202111390191.3, Notice of Publication dated Jun. 16, 2022, 12 pgs.

* cited by examiner

BRAZE COMPOSITION AND PROCESS OF USING

TECHNICAL FIELD

The disclosure relates generally to braze compositions for joining components. More particularly, this disclosure relates to braze compositions for joining turbine components, where the braze composition avoids formation of continuous centerline eutectic phase development, thus maintaining ductility of the braze joint.

BACKGROUND

The pace of change and improvement in the realms of joining components, such as but not limited to turbine components for power generation, aviation, and other fields has increased based on several factors. Such factors include turbomachinery constructions, higher operating temperatures of turbines, and accompanied intricacy of components used in these fields. In the assembly of combustor assemblies that include micromixer tubes within plate apertures, a process for fixing the tubes in order to stabilize the assembly and minimize vibration of the tubes within the plate is applied. In some instances, fixation is achieved by friction welding, and in other instances, by use of a relatively expensive brazing filler, which may include gold. Such fixation processes can be time consuming and expensive, and may not always achieve the desired result. In extreme settings, this could possibly necessitate rework. During operation, potential vibration of the micromixer tube within the plate aperture may lead to wear that can ultimately contribute to metal loss and micromixer tube tip failure, which can in turn lead to combustor inefficiency and possible failure.

BRIEF DESCRIPTION

A first aspect of the disclosure provides a composition comprising in approximate weight percentages:

| | |
|---|---|
| Chromium | 15-17 |
| Silicon | 2.5-3.5 |
| Cobalt | 6.0-8.0 |
| Aluminum | 1.0-2.0 |
| Tantalum | 1.5-2.5 |
| Boron | 1.5-2.5 |
| Yttrium | 0.015-0.025 |
| Nickel | balance, and incidental impurities. |

A second aspect of the disclosure provides a braze material comprising in approximate weight percentages:

| | |
|---|---|
| Chromium | 15-17 |
| Silicon | 2.5-3.5 |
| Cobalt | 6.0-8.0 |
| Aluminum | 1.0-2.0 |
| Tantalum | 1.5-2.5 |
| Boron | 1.5-2.5 |
| Yttrium | 0.015-0.025 |
| Nickel | balance, and incidental impurities. |

A third aspect of the disclosure provides a process of using a braze material comprising in approximate weight percentages:

| | |
|---|---|
| Chromium | 15-17 |
| Silicon | 2.5-3.5 |
| Cobalt | 6.0-8.0 |
| Aluminum | 1.0-2.0 |
| Tantalum | 1.5-2.5 |
| Boron | 1.5-2.5 |
| Yttrium | 0.015-0.025 |
| Nickel | balance, and incidental impurities. |

The process comprises applying the braze material to a joint between turbomachine components; heating the braze material to form a molten braze material, to cause the braze material to flow into the joint; and allowing the molten braze material to cool, solidify, and join the turbomachine components.

A further aspect of the of the disclosure provides braze material comprising in approximate weight percentages:

| | |
|---|---|
| Chromium | 16 |
| Silicon | 3 |
| Cobalt | 7 |
| Aluminum | 1.5 |
| Tantalum | 2 |
| Boron | 1.5 |
| Yttrium | 0.02 |
| Nickel | balance; and incidental impurities. |

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
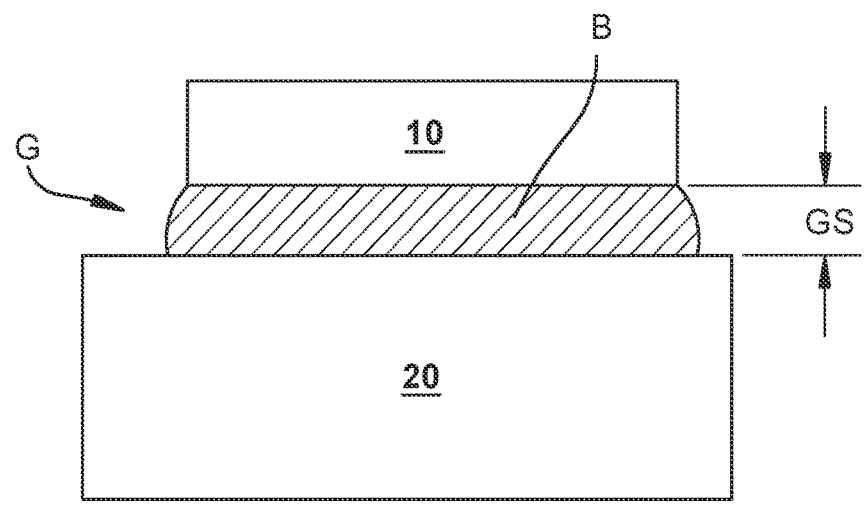
FIG. 1 illustrates schematic representation of objects joined by a braze composition according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant braze materials and processing. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular feature may be referred to using several different or overlapping terms. What may be described herein as being a single part may include and be referenced in another context as consisting of multiple features. Alternatively, what may be described herein as including multiple features may be referred to elsewhere as a single part.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Brazing processing is largely used in the gas turbine industry. A sound braze joint is formed when liquid braze metal moves into and fills into a gap of the two objects to be joined under capillary force. Moreover, a sound braze joint is formed with little or no centerline eutectic phases in the braze after braze solidification and the filet is substantially without porosity, as illustrated in FIG. 1. Additionally, a sound braze is substantially devoid of lack of braze regions in the brazed joint.

In a braze process, with reference to FIG. 1, a gap G defines a gap size GS between the two objects or components 10 and 20 to be joined by braze B. In certain aspects of the embodiments, objects 10 and 20 may include turbomachinery components. Further, in other aspects as embodied by the disclosure, objects 10 and 20 may include turbomachinery combustor components, such as but not limited to tubes and plates in a micromixer combustion assembly. Gap size GS can be managed in braze processing for a solid and desired full braze that fills the volume of the gap. For each braze filler metal, a recommended gap size GS range is often determined to obtain a sound braze joint that fills the gap volume.

For example, the recommended braze gap size range for AMDRY 100 (BNi-5) is between 0.0005" and 0.004" (0.012 mm and 0.1 mm) Also, the recommended braze gap size range for AMDRY DF4B is between 0.010" and 0.060" (0.254 mm and 1.5 mm). Even though braze gap size range is controlled, porosity or lack of braze (LOB) can still be observed if a proper volume of braze paste is not placed outside of the braze gap. Thus, rework may be necessary.

Often, braze gap size is not uniform. This non-uniformity can due to the tolerance of the objects base material. Accordingly, LOB and porosities in the braze may be observed via visual inspection. Again, rework may be necessary.

Moreover, if the braze gap size is larger than a recommended braze gap size for the braze, there is a potential for continuous centerline eutectic phase development. This continuous centerline eutectic phase development may be hard and brittle, thus decreasing ductility of the braze joint. Continuous hard and brittle eutectic phases may cause microfissures or macrofissures, which results in leakage and impacts the life cycle. The decrease ductility of braze joint can result in LOB, cracking, and leaking at the braze joint, which may also require rework.

In conventional brazing of hot gas path components in a gas turbine, such as but not limited to tubes and plates in a micromixer combustion assembly, braze foils may be used for brazing between tube and plate. In a micromixer combustion assembly, the gap size between the tube and plate may be hard to control. Accordingly, continuous eutectic phases may be observed in the braze joints where braze foils were used, including use when the braze gap size is larger than a certain threshold size.

In efforts to avoid formation of continuous eutectic phases in micromixer combustion assemblies, gold-based braze filler has been employed used in the brazing process, as noted above. In some advanced gas turbine machine that includes micromixer combustion assemblies, more than several thousand gold braze joints may be necessary, which leads to extensive use of gold and increased costs.

Therefore, as embodied by the disclosure, a braze material composition is set forth. The braze material composition includes enhanced flow ability to be utilized to fill braze gaps sized from narrow, medium, and large size together in one single braze thermal cycle. The braze material composition, as embodied by the disclosure, provides enhanced flow from a small to a large gap, which will enable sound brazes between objects, including but not limited to turbomachine components. Also, the braze material composition, as embodied by the disclosure, also avoids the undesirable hard and brittle centerline continuous eutectic phase with the eutectic phase's resultant decreased ductility.

The braze material composition, as embodied by the disclosure, includes the following constituents in the weight percent values in ranges where values are approximate:

| | |
|---|---|
| Chromium | 15-17 |
| Silicon | 2.5-3.5 |
| Cobalt | 6.0-8.0 |
| Aluminum | 1.0-2.0 |
| Tantalum | 1.5-2.5 |
| Boron | 1.5-2.5 |
| Yttrium | 0.015-0.025 |
| Nickel | BALANCE and incidental impurities. |

Moreover, in accordance with one aspect of the braze material composition is, in approximate weight percentages:

| | |
|---|---|
| Chromium | 16 |
| Silicon | 3 |
| Cobalt | 7 |

| | |
|---|---|
| Aluminum | 1.5 |
| Tantalum | 2 |
| Boron | 1.5 |
| Yttrium | 0.02 |
| Nickel | BALANCE and incidental impurities. |

Figure 2:
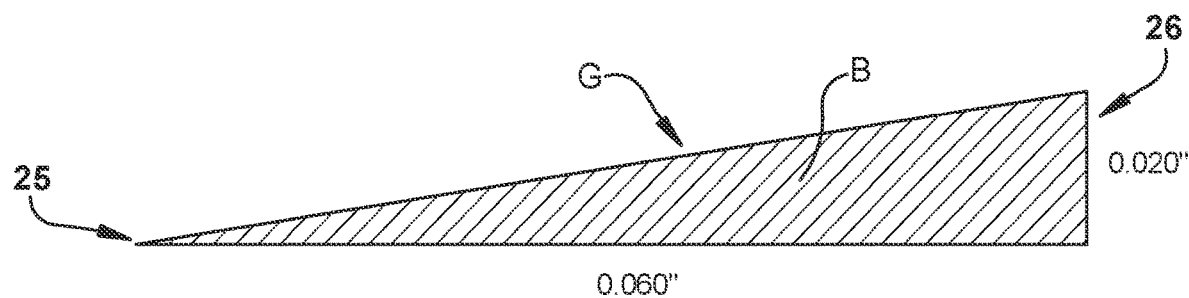
FIG. 2 illustrates a schematic representation of a wedge-shaped gap filled with a braze composition according to embodiments of the disclosure.

FIG. 2 illustrates a wedge shaped gap G with braze material composition B disposed therein per the utilization in accordance with embodiments of the disclosure. The braze material composition B, as embodied by the disclosure, can flow under capillary force from gap G opening 25 through gap G and to a terminus 26. Terminus 26 can be in gap G up to at least 0.060" (1.5 mm) and possibly further. Also, braze material composition B, as embodied by the disclosure, can flow under capillary force into gap G up to a gap height of at least 0.020" (0.5 mm). Therefore, braze material composition B can flow under capillary force and suitably fill the volume of gaps, such as gaps in turbomachinery including but not limited to gaps at combustors that include micromixer tubes disposed in plate apertures.

In use, the braze material composition B is applied at or to a joint or gap G. As noted above, in certain aspects of the embodiment, gap G may be a joint between turbomachine components, for example but not limited to gaps at combustors that include micromixer tubes disposed in plate apertures. Braze material is heated so the braze material composition B forms a molten braze material composition B. The molten braze material composition B flows into gap G under capillary forces is to cause the braze material to flow into the gap G. Thereafter the molten braze material composition B can cool, solidify, and join the turbomachine components.

Technical effects of the braze material composition, as embodied by the disclosure, include, but are not limited to, elimination of undesirable continuous centerline eutectic phases; decreasing the internal residual stress of braze joint due to these eutectic phases; reduce the cracking tendency by increasing ductility, and lowering leakage or LOB at the brazed gap.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A composition consisting essentially of comprising in approximate weight percentages:

| | |
|---|---|
| Chromium | 15-17 |
| Silicon | 2.5-3.5 |
| Cobalt | 6.0-8.0 |
| Aluminum | 1.0-2.0 |
| Tantalum | 1.5-2.5 |
| Boron | 1.5-2.5 |
| Yttrium | 0.015-0.025 |
| Nickel | balance, and incidental impurities. |

2. The composition of claim 1, wherein the composition is a braze composition.

3. The composition of claim 2, wherein the braze composition is configured to braze turbomachinery parts.

4. The composition of claim 3, wherein the turbomachinery parts include micromixer tubes within plate apertures.

5. The composition of claim 2, wherein the braze composition includes in approximate weight percentages:

| | |
|---|---|
| Chromium | 16 |
| Silicon | 3 |
| Cobalt | 7 |
| Aluminum | 1.5 |
| Tantalum | 2 |
| Boron | 1.5 |
| Yttrium | 0.02 |
| Nickel | balance; and incidental impurities. |

6. A braze material comprising:
   a composition consisting essentially of in approximate weight percentages:

| | |
|---|---|
| Chromium | 15-17 |
| Silicon | 2.5-3.5 |
| Cobalt | 6.0-8.0 |
| Aluminum | 1.0-2.0 |
| Tantalum | 1.5-2.5 |
| Boron | 1.5-2.5 |
| Yttrium | 0.015-0.025 |
| Nickel | balance, and incidental impurities. |

7. The braze material according to claim 6, the composition includes in approximate weight percentages:

| | |
|---|---|
| Chromium | 16 |
| Silicon | 3 |
| Cobalt | 7 |
| Aluminum | 1.5 |
| Tantalum | 2 |
| Boron | 1.5 |
| Yttrium | 0.02 |
| Nickel | balance; and incidental impurities. |

8. A process of using the braze material of claim 6, the process comprising:
   applying the braze material to a joint between turbomachine components;
   heating the braze material to form a molten braze material, to cause the braze material to flow into the joint; and
   allowing the molten braze material to cool, solidify, and join the turbomachine components.

9. The process according to claim 8, wherein the turbomachine components include turbomachine components of a combustor assembly.

10. The process according to claim 9, wherein the turbomachine components of a combustor assembly include portions of a micromixer.

11. The process according to claim 10, wherein the portions of the micromixer include micromixer tubes within plate apertures.

12. A braze material consisting essentially of comprising in approximate weight percentages:

| | |
|---|---|
| Chromium | 16 |
| Silicon | 3 |
| Cobalt | 7 |
| Aluminum | 1.5 |
| Tantalum | 2 |
| Boron | 1.5 |
| Yttrium | 0.02 |
| Nickel | balance; and incidental impurities. |

13. The braze material of claim 12, wherein the braze composition is configured to braze turbomachinery parts.

14. The braze material of claim 13, wherein the turbomachinery parts include micromixer tubes within plate apertures.

* * * * *